FILM OR TAPE READER

Filed Nov. 15, 1954 2 Sheets-Sheet 1

Inventor
Glenn D. McMurry
by George E. Frost
Attorney

Inventor
Glenn D. McMurry
by George E. Frost
Attorney

United States Patent Office 2,810,019

Patented Oct. 15, 1957

2,810,019

FILM OR TAPE READER

Glenn Deal McMurry, Culver City, Calif.

Application November 15, 1954, Serial No. 468,660

7 Claims. (Cl. 179—100.1)

The present invention relates to devices for reading the intelligence impressed upon thin strips, such as film or tape.

Intelligence is placed upon many different forms of strips or tapes. In magnetic recorders thin paper or plastic tape coated with a magnetizable material is commonly used. In the case of motion picture films—where the sound is carried in addition to the successive picture frames—the sound is recorded on a comparatively narrow magnetic or optical sound track running along one edge of the film.

There are many types of film upon which optical or magnetic sound recordings are placed. For example, in the case of motion picture films the widths vary widely depending upon the use that is to be made of the film, conventional film widths being ¼ inch, 16 millimeters, 17.5 millimeters and 35 millimeters. Moreover, the sound track may be placed along either edge of the film; the film may have either one or two sprocket tracks, and other variations may be encountered. Also, in the case of tapes bearing recorded sound but no picture frames a wide variation in width and track position is encountered.

During the course of editing the sound on a film, "dubbing in" sound at particular points on a film, transferring the sound from one type of film to another, or in preparing for these operations, it is necessary to locate a precise starting point, so that the sound will be properly timed in relation to the picture frames. Also, when a plurality of parent tapes or films form the sources from which a composite sound is to be recorded on a motion picture film by final printing it is desirable to have a device which permits the parent tapes to be "read" individually or in unison. These operations cannot be accomplished by inspection since neither an optical nor a magnetic sound track can be so read.

It is accordingly a general object of the present invention to provide an improved "reader" to locate a specific point on an optical or magnetic sound track.

Another object of the present invention is to provide a hand operable "reader" for optical or magnetic tape recordings.

Still another object of the present invention is to provide an improved hand operable "reader" for optical or magnetic tape recordings which can be used with a wide variety of film or tape widths and sound track locations.

Yet another object of the present invention is to provide an improved "reader" for optical or magnetic sound tracks which receives a plurality of tapes or films with sound tracks and permits either manual reading of individual tapes or films or the automatic simultaneous winding or reading of them in unison. Additionally, it is an object of the invention to provide an improved "reader" for optical or magnetic sound tracks which is of simple construction, inexpensive, reliable, and easily used to the end that the device has a wide range of commercial application.

Broadly stated, the present invention provides one or more pickup sensing devices such as magnetic heads mounted on a supporting frame and guides removably attached to the frame to guide the intelligence-carrying strips over the pickup devices. The guide means includes a plate provided with an aperture in registration with each of the pickup devices and a pair of guide bars adjacent to each aperture to guide the tape or film over each of the pickup devices so that the desired sound track is in proper registration with the pickup device or head. In addition, fingers are provided in parallel relation to the guide plate and overhanging the film to maintain the strips in contact with the guide plate and the pickup devices. The guides are removably carried by the frame and are carried in registered relation to the pickup devices thereon by suitable indexing conformations. Hence a plurality of such guides may be provided with a single support frame to accommodate the different width tapes and films. For accurate reading of the tapes or films individually they may be manually shifted either singly or in groups. For reading of the tapes in unison, for moving them in unison over the apparatus, or for recording from one film or tape to another, the films or tape may be mechanically drawn over the unit.

The novel features which I believe to be characteristic of my invention are set forth with particularity in the appended claims. My invention itself, however, both as to its construction and mode of operation, together with further objects and advantages thereof, may best be understood by reference to the following description taken in connection with the accompanying drawings, in which:

Figure 1:
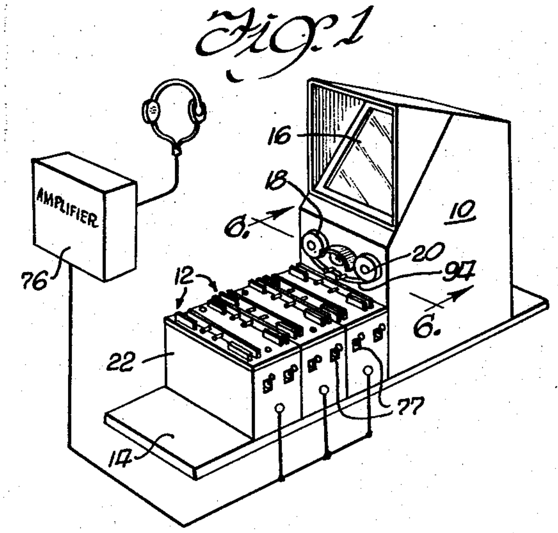
Figure 1 is a view in perspective of a film and tape reader constructed according to the present invention, electrical circuits being illustrated schematically.
Figure 2:
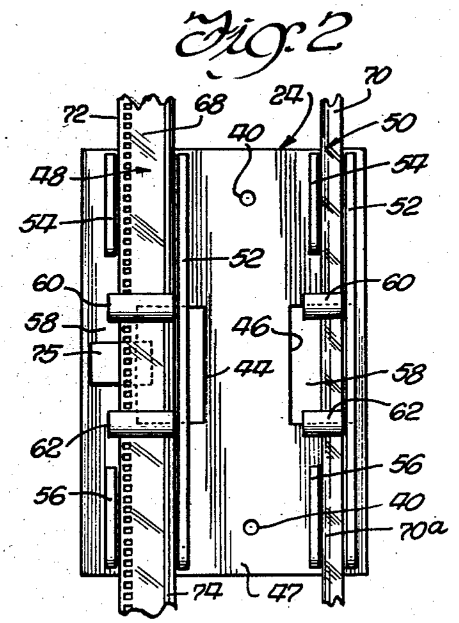
Figure 2 is an elevational view of a removable guide plate of the apparatus of Figure 1 and showing the position of the film and tape thereon.
Figure 5:
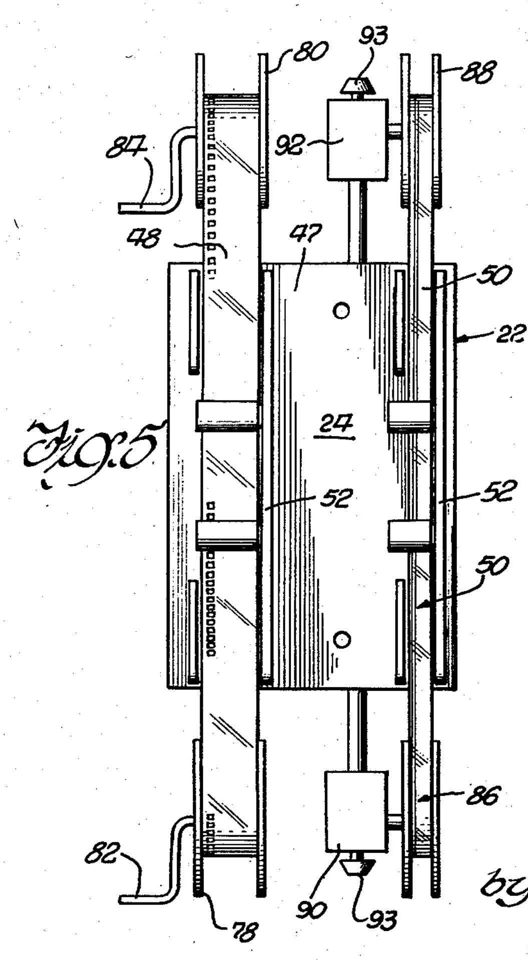
Figure 2A:
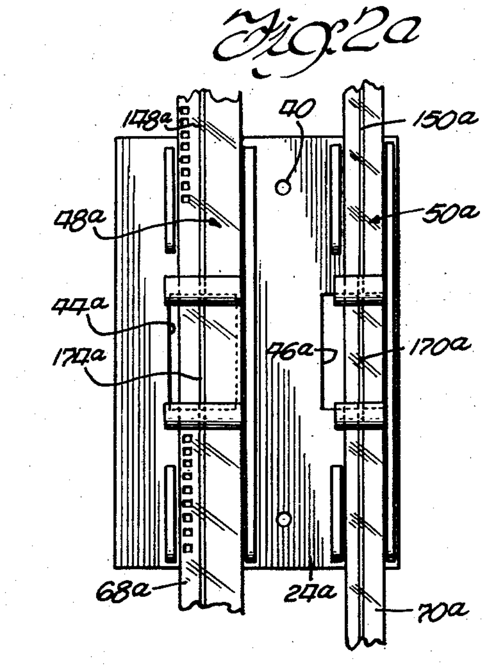
Figure 3:
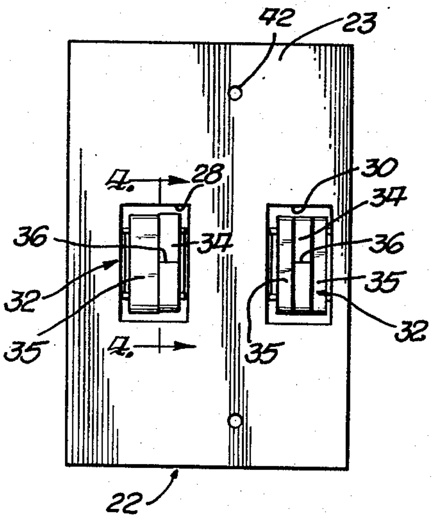
Figure 4:
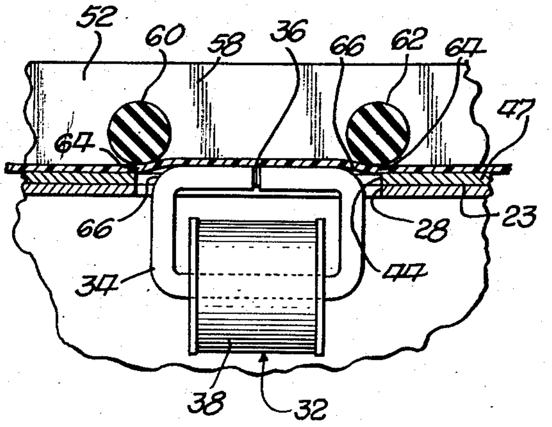
Figure 6:
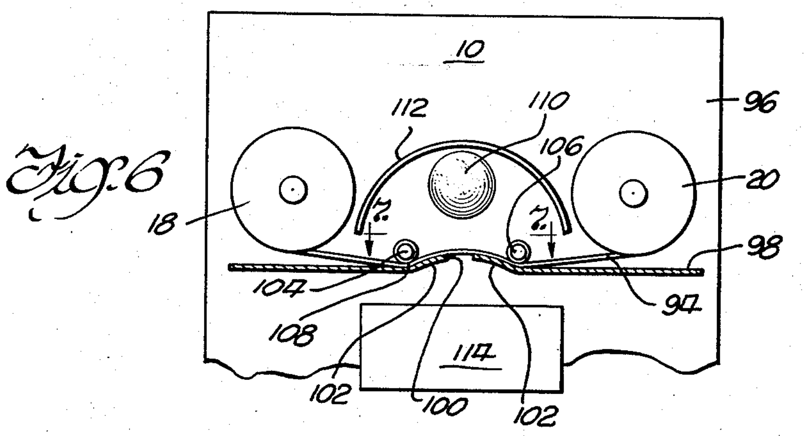
Figure 7:
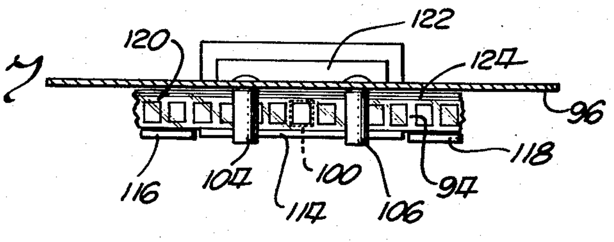

Figure 2*a* is a view like Figure 2 showing an alternative guide plate;

Figure 3 is an elevational view of one of the readers illustrated in Figure 1 with the guide plate removed;

Figure 4 is an enlarged sectional view taken along line 4—4 of Figure 3 but with a guide plate in position;

Figure 5 is a plan view of a modified embodiment of a reader constructed according to the teachings of the present invention;

Figure 6 is an enlarged sectional view of the film viewer taken along line 6—6 of Figure 1; and Figure 7 is an enlarged sectional view taken along line 7—7 of Figure 6.

Figure 1 illustrates a reader constructed according to the teachings of the present invention which is suitable for reading both tape and film. In this figure, a film viewer 10 is disposed adjacent to a plurality of magnetic tape readers 12 on a table 14. The film viewer 10 is provided with a screen 16 upon which the images from the successive frames of the motion picture film 94 are projected by suitable means (not shown). It is also provided with spools 18 and 20 which carry the film 94 to be wound over the projection mechanism as hereinafter described in detail.

The tape readers 12 are shown in detail in Figures 2 and 3. Each has a frame or supporting enclosure 22 with a flat surface 23 which supports a removable guide plate 24. A pair of rectangular shaped apertures 28 and 30 are disposed at opposite sides of the surface 23, and magnetic pickup and recording heads 32 are mounted in protruding position thereon. The magnetic heads 32 each have a ferromagnetic yoke 34 forming an air gap 36 which is disposed above the surface 23 of the frame or enclosure 22. A coil 38, Figure 4, is wound about each magnetic yoke 34 so that a time varying voltage is induced in the coil as the magnetized tape is moved over the air gap 36. Conversely, when a time varying current flows through the winding 38, a time varying field is created at gap 36 and a tape moving thereacross is magnetized along its length in accord with the intelligence. In addition, each head 32 has one or more magnetic keepers 35 to confine the magnetic action of the head to the region of the gap 36 and thus prevent cross-pickup from adjacent channels or cross-recording onto adjacent channels.

The removable guide plates, Figure 2, are provided with a pair of apertures 40 which receive guide pins 42 protruding from the surface 23 of each enclosure 22 to index the guide plates 24 on the enclosures 22. In addition, the guide plates 24 are provided with rectangular windows 44 and 46 which register with apertures 28 and 30 respectively. The magnetic heads 32 extend into the windows 44 and 46 and protrude above the surface 47 of the guide plate 24.

The guide plates are each provided with upstanding guides defining a pair of channels 48 and 50 for the strip materials, such as film or tape. These extend in parallel relation across the surface 47 of the guide plate 24. The channel 48 extends over the window 44 and the magnetic gap 36 of the magnetic head 32 in said window, and the channel 50 extends over the window 46 and adjacent to the magnetic gap 36 of the magnetic head 32 disposed within the window 46. Each of the channels 48 and 50 is defined by a guide bar 52 attached to the surface 47 of the guide plate 24 and extending upwardly therefrom, and a pair of aligned rails 54 and 56 which are also attached to the surface 47 of the guide plate 24 and disposed parallel to the bars 52. The rails 54 and 56 are spaced from each other, forming a gap 58 adjacent each window 44 and 46. A pair of cylindrical fingers 60 and 62 are attached to the bar 52 adjacent to the opposite margins of the windows 44 and 46 and extend outwardly from the bar parallel to each other and to the surface 47 of the guide plate 24 to overhang the respective film or tape receiving channels. The fingers 60 and 62 are spaced from the surface of the guide plate 24 by gaps 64 which are somewhat larger than the thickness of the strips to be used with the reader. The fingers 60 and 62 are disposed upon opposite sides of each of the magnetic heads 32 and the magnetic heads extend above the surface 47 of the guide plate 24 to define rounded surfaces 66 which extend above the surface 47, as illustrated in Figure 4.

As indicated in Figure 2, channel 48 is wider than channel 50, although guide plates may be constructed in which this is not true. Figure 2 also illustrates a strip in the form of a film 68 disposed in the channel 48 and a strip in the form of a magnetic tape 70 disposed in the channel 50. The film 68 is provided with perforations 72 and a magnetic sound track 74 adjacent to its side opposite to the perforations. The channel 48 positions this sound track 74 directly over the magnetic gap 36 of the magnetic head 32. It is to be noted that the bar 52 of the channel 48 actually passes over the aperture 28 in the surface 23 of the enclosure 22, in order to position the sound track adjacent to the magnetic gap 36 of the head 32. However, the bar 52 of the channel 50 is aligned with the edge of the aperture 30 in the enclosure 22 in order properly to position the magnetic tape 70 adjacent to the magnetic gap 36 of the head 32 disposed within the aperture 30, the tape 70 having a particular sound track of interest and extending along the length of that tape as indicated by the dotted lines 70*a*. The position of the channels 48 and 50 and their widths are determined by the strip material to be disposed thereon, and since the guide plates 24 are removable, a plurality of such guide plates may be provided with a single tape reader 12 to permit two tapes or strips of not only different widths to be read at the same time, but also strips having sound tracks located in different regions of the strip.

In an alternative method of indexing the guide plate 24, a member 75 may be provided to seat adjacent the protruding part of the sound head itself. The member 75 may also form a continuation of the rounded surface 66, Figure 4, formed by the head 32 and thus aid in guiding the film or tape over the head without twisting.

The magnetic heads 32 are connected through a conventional amplifier 76 having a separate channel for each of the heads. Each of the channels is separately controlled by a switch 77. By monitoring the output of a given channel of the amplifier 76, the intelligence upon the strip disposed adjacent to the magnetic head 32 of that channel will be monitored. The strip must be translated along the channel 48 or 50 in order to produce intelligence, and this translation may be accomplished manually or by mechanical means. When it is desired to locate a particular point upon an intelligence strip, manual translation is generally used, particularly when it is known that this point is in a particular restricted region of the strip. However, if it is desired to produce the intelligence with fidelity, or to cover large regions of the strip, mechanical means are generally employed. In either event, the strip is disposed within one of the channels 48 or 50 by slipping the tape beneath the fingers 60 and 62 and maintaining it flush with the surface 47 of the guide plate 24 between the bar 52 and the rails 54 and 56.

Figure 5 illustrates an enclosure 22 provided with a reel adjacent to both ends of each of the channels 48 and 50. As illustrated, film reels 78 and 80 are mounted to the surfaces of the enclosure 22 adjacent to the surface 23 and aligned with the channel 48. The reels 78 and 80 are each provided with a hand crank 82 and 84 for manual manipulation, and are further disposed slightly beneath the surface 23 of the enclosure 22 so that the film 68 will remain in contact with the surface 47 of the guide plate 24. Reels 86 and 88 are also mounted to the surfaces of the enclosure 22 adjacent to the surface 23 and aligned with the channel 50 for mechanical translating tape through this channel. These reels 86 and 88 are provided with electrical motors 90 and 92 to translate the tape through the channel 50 in either direction, the motors having adjustable speed controls 93. Motor 92 pulls the tape in the same direction as it was recorded, and its control 93 may be calibrated to produce fidelity.

The viewer 10 is provided with film spools 18 and 20, as indicated above, and is thus adapted to produce a visual indication on the screen 16 thereof corresponding to the intelligence upon a film, designated 94, disposed upon the spools 18 and 20. As indicated in Figures 1, 6 and 7, the spools 18 and 20 are mounted to the face 96 of the viewer 10 above a guide plate 98 which is attached to the face 96 of the viewer 10 as illustrated. Midway between the spools 18 and 20, is an aperture 100 in the plate 98, the plate 98 having upwardly curving surfaces 102 adjacent to the aperture to provide a generally rounded contour. A pair of fingers 104 and 106 extend outwardly from the face 96 of the viewer parallel to the plate 98 and on opposite sides of the aperture 100, the fingers 104 and 106 being spaced from the plate 98 by gaps 108 slightly larger than the thickness of the film 94. A lamp 110 is disposed between the spools 18 and 20 confronting the aperture 100, and a light impermeable housing 112 which has a semi-circular cross section is disposed about the lamp 110. An optical focusing device 114 is disposed adjacent to the aperture 100 on the side opposite to the lamp 110 and focuses an image from the film 94 upon the screen 16. The film 94 extends from spool 18, which is the supply spool, under the finger 104 over the rounded surfaces 102 of the plate 98 and the aperture 100, under the finger 106 to the take-up spool 20. Lateral movement of the film 94 is prevented by rails 116 and 118, illustrated in Figure 7, which are aligned with each other and disposed parallel to the face 96 of the viewer forming a path 120 for the film.

It is of course apparent that the magnetic head 32 disposed adjacent to the channel 48 in which the film 68, Figure 2, is disposed could be replaced by a light responsive detection device. It is also clear, that the viewer 10 itself could have been provided with removable guide plates 24 of the type used for the readers 12. Further, it is clear that the guide plates 24 could be provided with but a single strip path, rather than with two paths as illustrated.

The guide plate **24*a*** of Figure 2*a* may be substituted for that of Figure 2 when films **68*a* and 70*a* are desired to be read. The upstanding guide bars on this guide plate are positioned to locate the sound tracks 170*a* and 174*a* of these films over the pickup heads 32**, Figure 3.

In practical application, the tapes to be edited are ordinarily of one kind, both as to the recording (and hence pickup) velocity and as to the width and placement of the sound track. Accordingly, the guide plates 24 in such an arrangement would be identical in construction and would have guide channels 48 of like width and position in relation to the magnetic pickup head 32, Figure 3. In this instance the winding mechanism by which the tapes are wound mechanically can include elements, such as capstans driven at like speed by a single shaft, so that all the tapes are driven at like speed.

In a mechanism such as that of Figure 5—where tapes recorded at different speeds are used—it is likewise possible to provide playback in unison by the use of synchronized winding apparatus which imparts to each tape the speed at which intelligence is recorded on it.

While I have shown and described only magnetic and optical pickup devices in conjunction with the apparatus above described, magnetic or optical sound recording devices may be used in conjunction with one or more of the films or tape. Such an arrangement is, of course, necessary when it is desired to record the sound onto one of the films or tapes.

In use, separate films or tapes are each wound using a crank or motor operated mechanism until each point of interest is approximately reached. Then the operator can take the film or tape and—grasping it on opposite sides of the reader—shift it back and forth while listening to the reproduced sound. It will be found that with some experience it is possible accurately to locate a point on the film or tape— even to the extent of locating the first syllable of a word. This process can be repeated to position each of the films or tapes involved at the desired position. If desired, the point of interest may be marked on the tape in question, or a notation made in some other permanent form. Thereupon the films or tapes may all be moved in unison by suitable winding mechanism (not shown), to move them all to the next point of interest or to record the desired passage from one tape or film onto another.

The apparatus is particularly useful in preparing for the final printing of a picture film with a sound track. By first running all the parent sound tapes through the apparatus of the present invention—and marking each point of interest—the making of the final composite film with the pictures and with the various sound sources fading in and out is greatly facilitated.

In the foregoing use of the apparatus the heads 32 are used interchangeably for recording or for pickup purposes. For example, one head 32 may be used solely for recording on a master film or tape the composite of selected portions of the other films or tapes, while the other heads 32 are used selectively as pickup heads and pick up the intelligence.

While I have shown and described specific embodiments of the present invention it will, of course, be understood that many variations and alternative embodiments may be made without departing from the true spirit and scope thereof. I therefore intend by the appended claims to cover all modifications and alternative constructions falling within their true spirit and scope.

What I claim as new and desire to secure by Letters Patent of the United States is:

1. A reader for a strip bearing a recorded intelligence, the reader comprising: a frame having an intelligence pickup device thereon; a guide carried by the frame and having conformations in fitting relation with the frame to index the guide in relation to the frame, the guide having a window in registry with the pickup device; spaced parallel upstanding guide bars mounted on said guide in position to define a guideway extending over the window, one of said bars being interrupted adjacent said window; and guide fingers carried by the other of said guide bars and overhanging the guideway on opposite sides of the window to hold the strip adjacent the face of the guide.

2. A strip reader comprising a frame, a device mounted to the frame for producing an electrical response to intelligence disposed upon a strip, and a strip guide attached to the frame including a support plate provided with an aperture confronting the intelligence responsive device, a bar mounted to the surface of the support plate opposite to the frame and adjacent to the aperture in the support plate, a pair of aligned rails mounted to the surface of the support plate parallel to the bar, each rail terminating adjacent to the aperture in the support plate, and a pair of outwardly extending fingers attached to the bar disposed in parallel spaced relationship with the support plate and confronting the sides of the aperture in the support plate.

3. A device for editing strips comprising a frame, a plurality of devices mounted on the frame in spaced relationship for producing electrical responses to intelligence disposed upon strips, and a strip guide removably attached to the frame, said guide having a support plate provided with an aperture confronting each of the intelligence responsive devices, and a pair of parallel spaced bars mounted on the surface of the support plate adjacent to each aperture and defining a strip path extending over each of the apertures in the support member.

4. A device for editing strips comprising a frame, a plurality of devices for producing electrical responses to intelligence disposed upon strips mounted on the frame in spaced relationship, and a strip guide including a support plate provided with an aperture confronting each of the intelligence responsive devices, a bar mounted on the surface of the support plate opposite to the frame adjacent to each of the apertures in the support plate, a pair of aligned rails mounted on the surfaces of the support plate parallel to each of the bars, each of the rails of each pair of rails terminating at one end adjacent to one of the apertures in the support plate, and a pair of outwardly extending fingers attached to each of the bars disposed in parallel spaced relationship to the support plate and confronting the sides of the adjacent aperture in the support plate.

5. A reader for use in reading the intelligence on different types of strips having sound tracks comprising in combination: a frame having an intelligence pickup device thereon; a plurality of guides removably carried by the frame and having conformations in fitting relation with the frame to index the guides in relation to the frame, each guide having a window in registry with the pickup device; spaced parallel upstanding guide bars mounted on each guide, in position to define a guideway extending over the window, one guide bar on each guide being interrupted adjacent said window, the guide bars on each guide being located to guide a different type of strip over the window with the sound track thereon riding over the pickup; and guide fingers carried by the other guide bar of each guide and overhanging the guideway on opposite sides of the window to hold the strip adjacent the face of the guide.

6. A mechanism for recording sound from one strip bearing a recorded intelligence onto another strip: the mechanism comprising a frame having a pair of pickup and recording heads; a guide removably carried by the frame and having conformations in fitting relation to the frame to index the guide in relation to the frame, the guide having windows in registry with the heads respectively; pairs of spaced parallel upstanding guide bars mounted on said guide to define guideways extending over the windows, respectively, to guide said strip over the heads, respectively, one guide bar of each pair being interrupted adjacent the corresponding window; and guide fingers carried by the other guide bar of each pair and overhanging the guideway on opposite sides of the respective window to hold the respective strip adjacent the face of the guide.

7. A reader for a strip bearing a magnetically recorded intelligence, the reader having a magnetic head thereon and a top face above which the head protrudes; a guide removably carried by the frame and having conformations in fitting relation with the frame to index the guide in relation to the frame, the guide having a window in registry with the head; spaced parallel upstanding guide bars mounted on said guide in position to define a guideway extending over the window, one of said bars being interrupted adjacent said window; and guide fingers carried by the other of said guide bars and overhanging the guideway on opposite sides of the window to hold the strip against the protruding face of the head.

References Cited in the file of this patent

UNITED STATES PATENTS

| | | |
|---|---|---|
| 2,611,838 | Gunby | Sept. 23, 1952 |
| 2,644,690 | Krag | July 7, 1953 |
| 2,647,168 | Rivas | July 28, 1953 |
| 2,682,410 | Bauman | June 29, 1954 |